(12) United States Patent
Bradski (10) Patent No.: US 6,394,557 B2
(45) Date of Patent: *May 28, 2002

(54) METHOD AND APPARATUS FOR TRACKING AN OBJECT USING A CONTINUOUSLY ADAPTING MEAN SHIFT

(75) Inventor: Gary Rost Bradski, Palo Alto, CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 149 days.

(21) Appl. No.: 09/079,917

(22) Filed: May 15, 1998

(51) Int. Cl.[7] .................................................. G06K 9/00
(52) U.S. Cl. ...................................... 302/103; 348/169
(58) Field of Search .............................. 353/7; 382/116, 382/207; 700/259; 345/427; 348/169; 701/207

(56) References Cited

U.S. PATENT DOCUMENTS

| | | | | |
|---|---|---|---|---|
| 4,907,169 A | * | 3/1990 | Lovoi ......................... | 364/513 |
| 5,267,329 A | * | 11/1993 | Ulich et al. .................... | 382/48 |
| 5,280,530 A | * | 1/1994 | Trew et al. .................... | 382/1 |
| 5,285,273 A | * | 2/1994 | Raymond et al. ........... | 384/169 |
| 5,287,437 A | | 2/1994 | Deering ....................... | 395/127 |
| 5,394,202 A | | 2/1995 | Deering ......................... | 353/7 |
| 5,446,834 A | * | 8/1995 | Deering ...................... | 395/127 |
| 5,751,831 A | * | 5/1998 | Ono ............................ | 382/103 |
| 5,771,307 A | * | 6/1998 | Lu et al. ..................... | 382/116 |
| 5,961,571 A | * | 10/1999 | Gorr et al. .................. | 701/207 |

OTHER PUBLICATIONS

Gary Rost Bradski and Mark Holler, "Computer Vision Modules for Game Interfaces and in Virtual Holography", Workshop on Perceptual User Interfaces, Banff, Alberta, Canada, Oct. 19–21, 1997, pp. 10–13.

D. Comanicio and P. Meer, "Robust Analysis of Feature Spaces: Color Image Segmentation", CVPR'97, pp. 750–755.

L.D. Cutler, B. Frohlich, and P. Hanarahan, "Two–Handed Direct Manipulation on the Responsive Workbench", Symposium on Interactive 3D Graphics, 1997, pp. 107–191, 1–4.

M. Ward, R. Azuma, R. Bennett, S. Gottschalk, and H. Fuchs, "A Demonstrated Optical Tracker With Scalable Work Area for Head–Mounted Display Systems", Proceedings of the 1992 Symposium on Interactive 3D Graphics, Cambridge, MA, pp. 43–52.

J.R. Parker, "Algorithms for Image Proceeding and Computer Vision", John Wiley & Sons, Inc., 1997, pp. 241–243.

W.T. Freeman, K. Tanaka, J. Ohta, and K. Kyuma, "Computer Vision for Computer Games", Int. Conf. on Automatic Face and Gesture Recognition, 1996, pp. 100–105.

* cited by examiner

Primary Examiner—Matthew C. Bella
Assistant Examiner—M B Choobin
(74) Attorney, Agent, or Firm—Blakely, Sokoloff, Taylor & Zafman LLP

(57) ABSTRACT

A tracking method is disclosed. The method of the present invention tracks a object using a probability distribution of the desired object. The method operates by first calculating a mean location of a probability distribution within a search window. Next, the search window is centered on the calculated mean location. The steps of calculating a mean location and centering the search window may be performed until convergence. The search window may then be resized. Successive iterations of calculating a mean, centering on the mean, and resizing the search window track an object represented by the probability distribution. In one embodiment, a flesh hue probability distribution is generated from an input video image. The flesh hue probability distribution is used to track a human head within the video image.

20 Claims, 10 Drawing Sheets

METHOD AND APPARATUS FOR TRACKING AN OBJECT USING A CONTINUOUSLY ADAPTING MEAN SHIFT

FIELD OF THE INVENTION

The present invention relates to the field of image processing, computer vision, and computer graphical user interfaces. In particular, the present invention discloses a video image based tracking system that allows a computer to identify and track the location of a moving object within a sequence of video images.

BACKGROUND OF THE INVENTION

There are many applications of object tracking in video images. For example, a security system can be created that tracks people that enter a video image. A user interface can be created wherein a computer tracks the gestures and movements of a person in order to control some activity.

However, traditional object tracking systems are computationally expensive and difficult to use. One example of a traditional method of tracking objects in a scene uses object pattern recognition and edge detection. Such methods are very computationally intensive. Furthermore, such systems are notoriously difficult to train and calibrate. The results produced by such methods often contain a significant amount of jitter such that the results must be filtered before they can be used for a practical purpose. This additional filtering adds more computation work that must be performed. It would therefore be desirable to have a simpler more elegant method of visually tracking a dynamic object.

SUMMARY OF THE INVENTION

A method of tracking a dynamically changing probability distribution is disclosed. The method operates by first calculating a mean location of a probability distribution within a search window. Next, the search window is centered on the calculated mean location and the search window is then resized. Successive iterations of calculating a mean, centering on the mean, and resizing the search window track an object represented by the probability distribution.

Other objects, features, and advantages of present invention will be apparent from the company drawings and from the following detailed description that follows below.

BRIEF DESCRIPTION OF THE DRAWINGS

The objects, features and advantages of the present invention will be apparent to one skilled in the art, in view of the following detailed description in which.

DETAILED DESCRIPTION OF THE PREFERRED EMBODIMENT

A method and apparatus for object tracking using a continuous mean shift method is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to an image flesh hue probability distribution. However, the same techniques can easily be applied to other types of dynamically changing probability distributions.

The Overall Object Tracking System

A method of tracking objects using a continuously adaptive mean shift method on a probability distribution is disclosed. To simplify the disclosure of the invention, one embodiment is presented wherein a human head is located and tracked within a flesh hue probability distribution created from video image. However, the present invention can easily be used to track other types of objects using other types of probability distribution data. For example, the present invention could be used to track heat emitting objects using an infrared detection system. The present invention can also be used to track objects that are described using non image data such as population distributions.

The disclosed embodiment operates by first capturing a "talking head" video image wherein the head and shoulders of the target person are within the video frame. Next, the method creates a two dimensional flesh hue probability distribution using a preset flesh hue histogram. Then, the location of the target person's head is determined by locating the center of the flesh hue probability distribution. To determine the orientation of the target person's head, the major and minor axis of the flesh hue probability distribution is calculated.

Capturing the Data
Example Hardware

Figure 1:
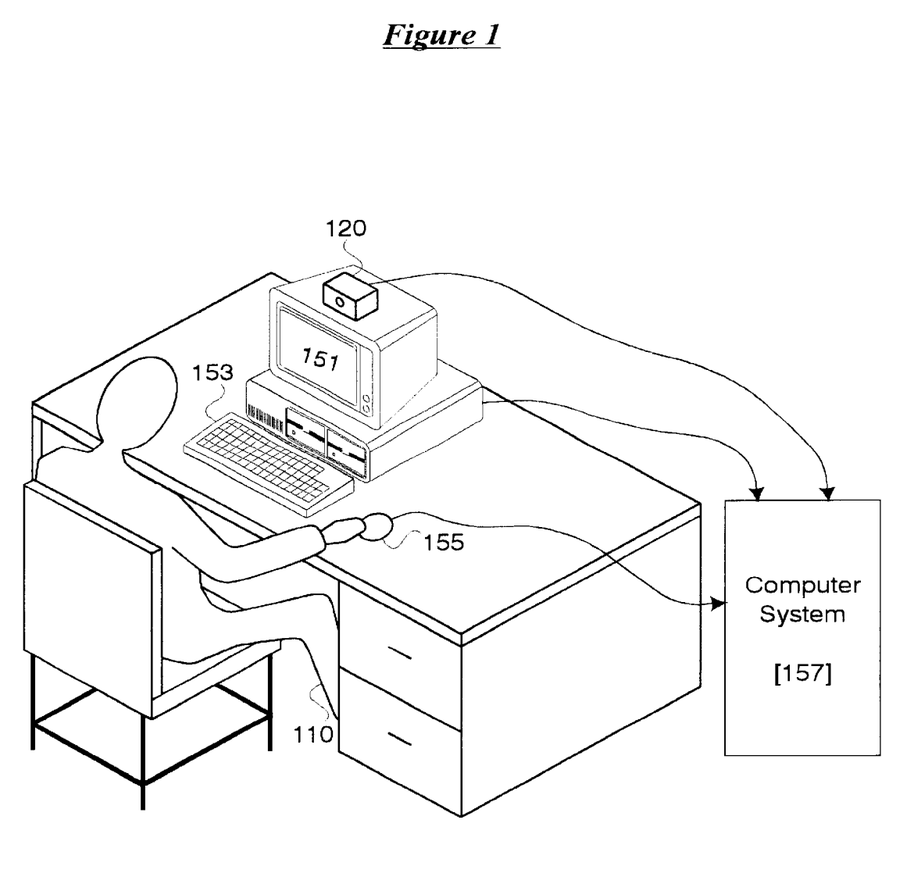
FIG. 1 illustrates an example computer workstation that may use the teachings of the present invention.

FIG. 1 illustrates one possible system for using the teachings of the present invention. In the illustration of FIG. 1, a user 110 is seated in front of a video camera 120. The video camera 120 is used to capture a "talking head" image of the user 110. In the embodiment of FIG. 1, the user is using a computer workstation that comprises a visual display monitor 151, a keyboard 153 for alphanumeric input, a mouse 155 for cursor positioning, and a computer system 157.

Generating a Flesh Hue Histogram

Figure 2:
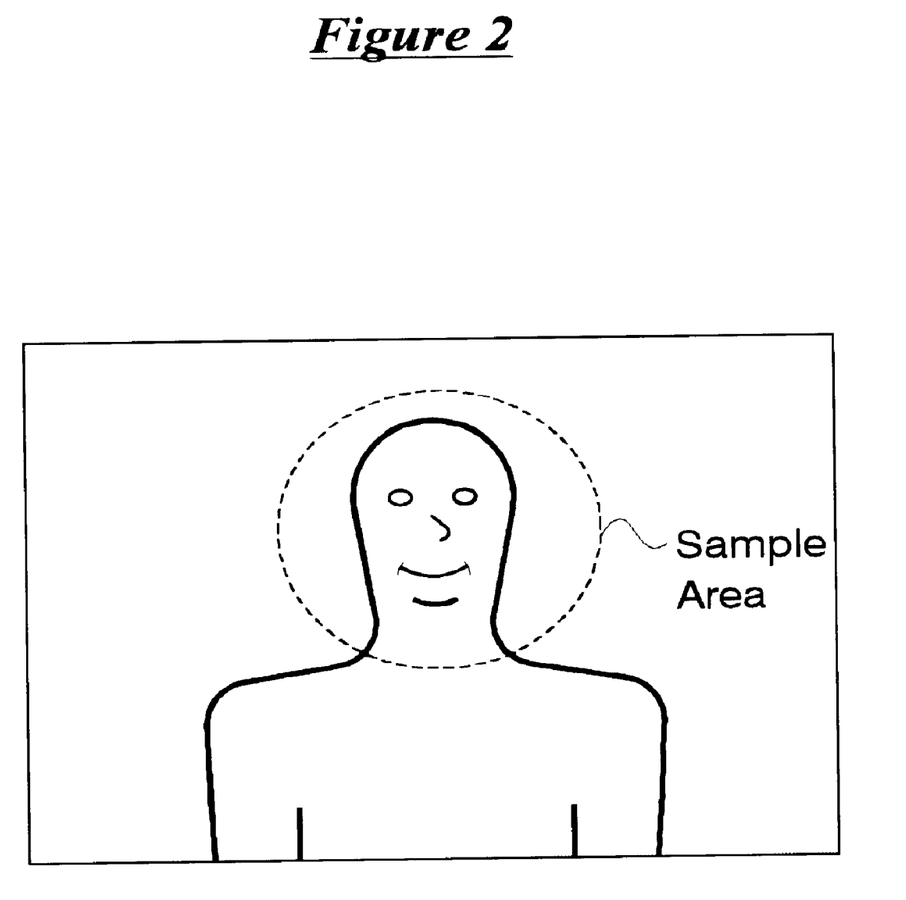
FIG. 2 illustrates a pixel sampling of a human face.

The computer system 157 digitizes the "talking head" image of the user 110 captured by video camera 120. To build a flesh hue histogram, the user positions himself such that the user's head fills a sample area of an image captured by video camera 120. Specifically, referring to FIG. 2, an image of a "talking head" image is displayed where the user's head substantially or completely fills the sample area. The pixels in the sample area are then used to build a flesh hue histogram.

Figure 3A:
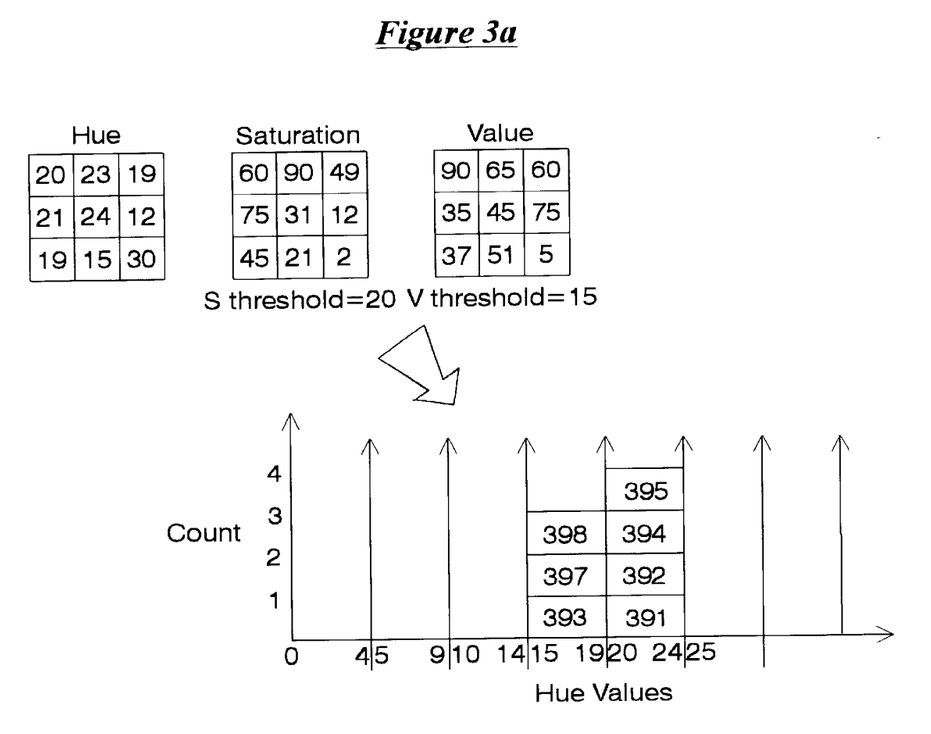
FIG. 3A illustrates a small portion of sample image being converted into a flesh hue histogram.

In one embodiment, each pixel in the video image is converted to or captured in a hue (H), saturation (S), and value (V) color space. Certain hue values in the sample region are accumulated into a flesh hue histogram. FIG. 3A illustrates a small nine by nine pixel block that has been divided into its hue (H), saturation (S), and value (V) components being converted into a flesh hue histogram. In the embodiment of FIG. 3A, the hue values are grouped into bins wherein each bin comprises five consecutive hue values. Hue values are only accumulated if their corresponding saturation (S) and value (V) values are above respective saturation (S) and value (V) thresholds. Referring to the example of FIG. 3A, the S threshold is 20 and the V threshold is 15 such that a pixel will only be added to the flesh hue histogram if the pixel's S value exceeds 20 and the pixel's V value exceeds 15. Starting at the upper left pixel, this first pixel is added to the flesh hue histogram since the pixel's S value exceeds 20 and the pixel's V value exceeds 15. Thus, a marker 391 is added to the 20 to 24 hue value bin. Similarly, the center pixel of the top row will be added to the 20 to 24 hue value bin as illustrated by marker 392. The center pixel of the right most column will not be added to the flesh hue histogram since its Saturation value does not exceed 20.

Figure 3B:
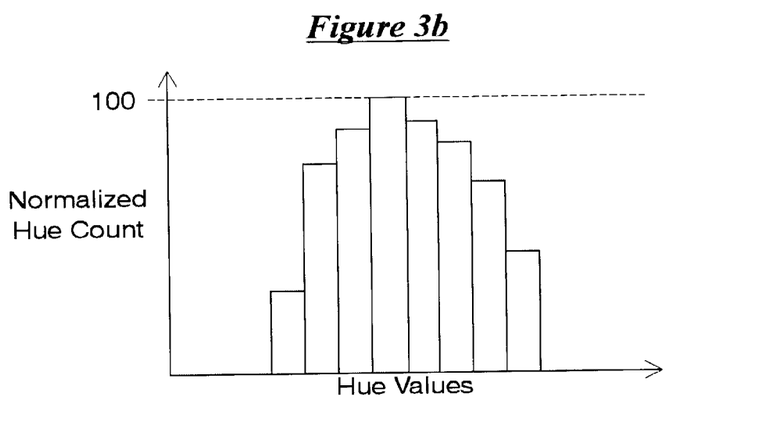
FIG. 3B illustrates a normalized flesh hue histogram created by a sampling a human face.

After sampling all the pixels in the sample area, the flesh hue histogram is normalized such that the maximum value in the histogram is equal to a probability value of one ("1"). In a percentage embodiment of FIG. 3B, all the histogram bins contain flesh hue probability values between zero ("0") and one hundred ("100") as illustrated in FIG. 3B. Thus, in the normalized flesh hue probability histogram illustrated in FIG. 3B, pixel hues that are likely to be flesh hues are given high percentage values and pixel hues that are not likely to be flesh hues are given low probability values.

Generating a Flesh Hue Probability Images

Figure 4:
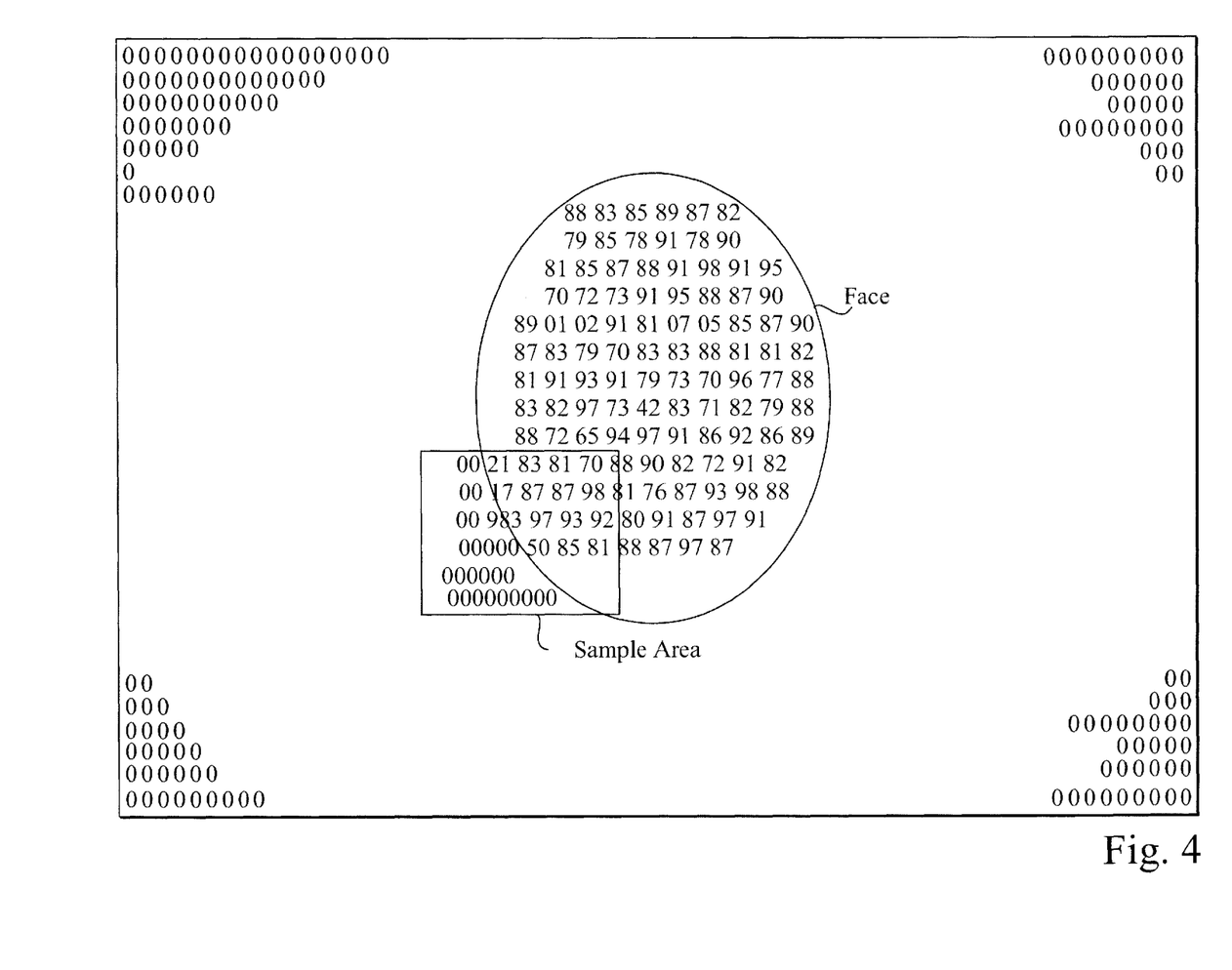
FIG. 4 illustrates a probability distribution of flesh hues of an input image.

Once a flesh hue probability histogram has been created, the computer system 157 can quickly convert video images captured from the video camera into flesh hue probability distributions. This is performed by replacing the pixels in a video image with the their respective flesh hue probability values by using the flesh hue histogram of FIG. 3B as a look up table. FIG. 4 illustrates an example of a two dimensional image of a talking head wherein the pixels have been replaced with a percentage probability value that specifies the probability of the pixel being flesh. As apparent in FIG. 4, the pixels that comprise the person's face are given high probabilities of being flesh.

Object Tracking Using Mean Shift

Once a probability distribution has been created, the teachings of the present invention can be used to locate the center of an object and to track the object. An early embodiment of the present invention uses a standard mean shift method to track objects that have been converted into probability distributions.

Figure 5:
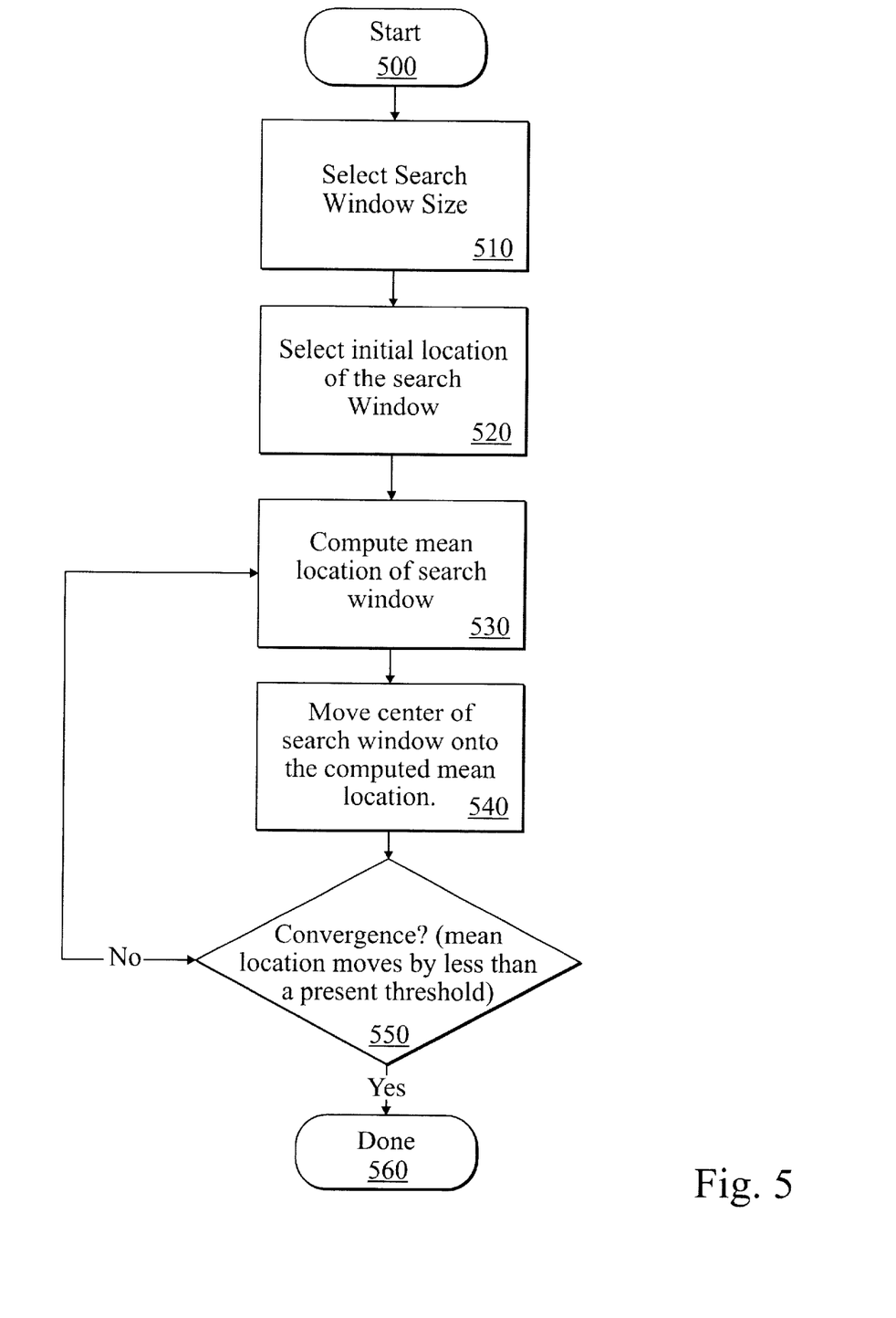
FIG. 5 illustrates a flow diagram describing the operation of the mean shift method.

FIG. 5 graphically illustrates how the standard mean shift method operates. Initially, at steps 510 and 520, an initial search window size and initial search window location are selected. The method then computes the "mean" location of the search window at step 530. At step 540, the center of the search window is moved onto the mean location that was computed in step 530. At step 550, the method determines if it has converged upon the center of the probability distribution. This can be done by determine if the search was moved by a value less than a preset threshold value. If the an shift method has converged, then it is done. If the mean shift method has not converged then the method returns to step 530 where the mean of the new search window location is calculated.

Figure 6:
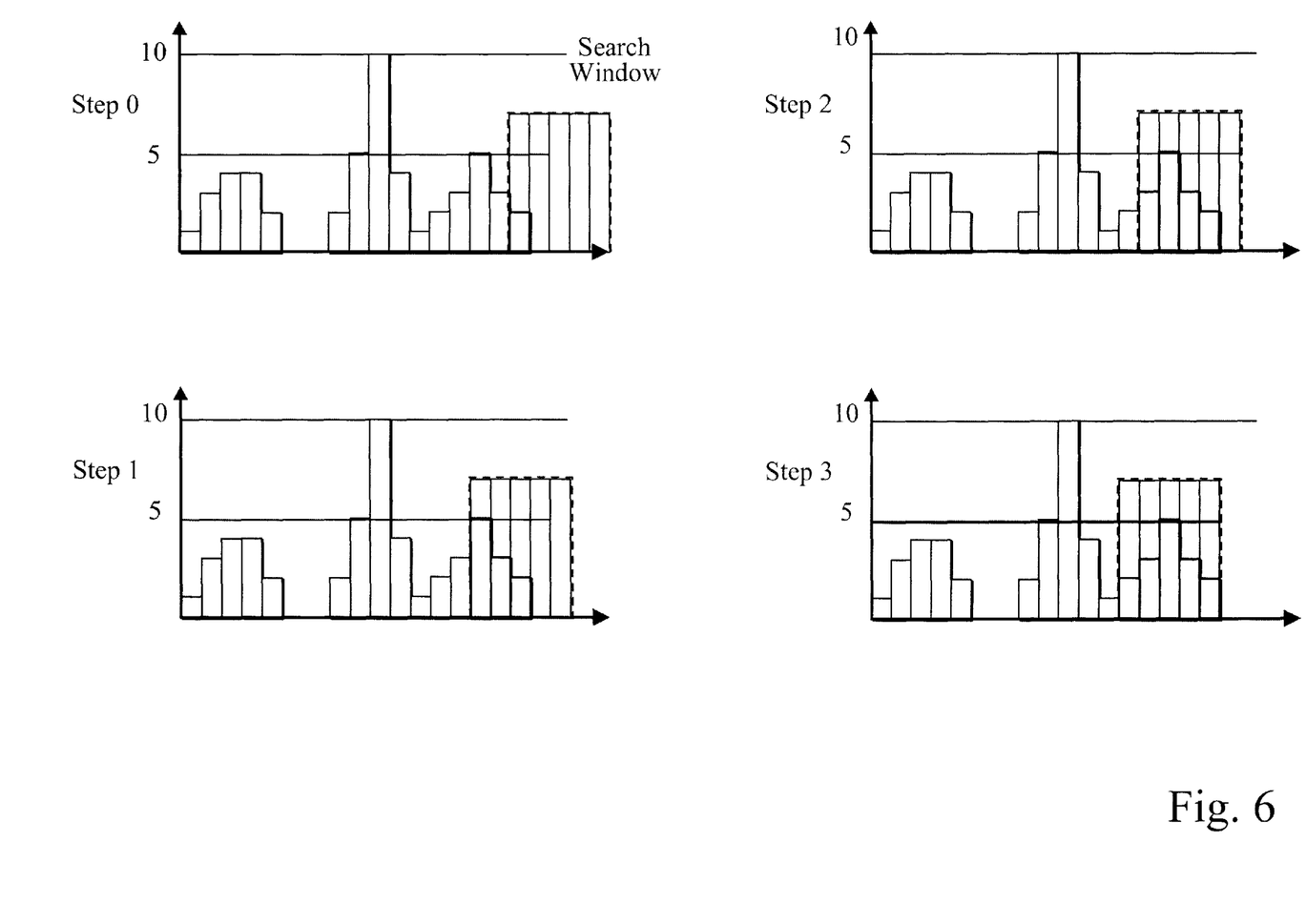
FIG. 6 illustrates an example of a continuously adaptive mean shift method applied to one dimensional data.

An example of the mean shift method in operation is presented in FIG. 6. To simplify the explanation, the example is provided using a one dimension slice of a two dimensional probability distribution. However, the same principles apply for a two or more dimensional probability distribution. Referring to step 0 of FIG. 6, a five sample wide search window is placed at an initial location. After a first iteration of the method, the search window is moved to the left as illustrated in step 1 of FIG. 6. The search window was moved left since the mean location of the search window samples was left of the initial search window location. After a second iteration, the search window is again moved left as illustrated in step 2. The search window was moved left since the mean location of the search window samples in step 1 is left of the center of the search window in step 1. After a third iteration, the search window again moves left. However, for all subsequent iterations, the search window will remain stationary (provided the distribution data does not change). Thus, by the third iteration, the mean shift method has converged.

To use the mean shift method for two dimensional image data, the following procedures are followed:

Find the zeroth moment:

$$M_{00} = \sum_x \sum_y I(x, y). \qquad (1)$$

Find the first moment for x & y:

$$M_{10} = \sum_x \sum_y xI(x, y); \qquad M_{01} = \sum_x \sum_y yI(x, y). \qquad (2)$$

Then the mean location (the centroid) is:

$$x_c = \frac{M_{10}}{M_{00}}; \qquad y_c = \frac{M_{01}}{M_{00}}. \qquad (3)$$

Where I(x, y) is the image value at position (x, y) in the image, and x and y range over the search window.

The mean shift method disclosed with reference to FIG. 5 and FIG. 6 provides relatively good results, but it does have a few flaws. For example, for dynamically changing and moving probability distributions such as probability distributions derived from video sequences, there is no proper fixed search window size. Specifically, a small window might get caught tracking a user's nose or get lost entirely for large movements. A large search window might include a user and his hands as well as people in the background. Thus, if the distribution dymanically changes in time, then a static search window not produce optimal results.

Object Tracking Using Continuously Adaptive Mean Shift

To improve upon the mean shift method, the present invention introduces a continuously adaptive mean shift method referred to as a CAMSHIFT method. The CAMSHWF method dynamically adjusts the size of the search window to produce improved results. The dynamically adjusting search window allows the mean shift method to operate better in environments where the data changes dynamically.

Figure 7:
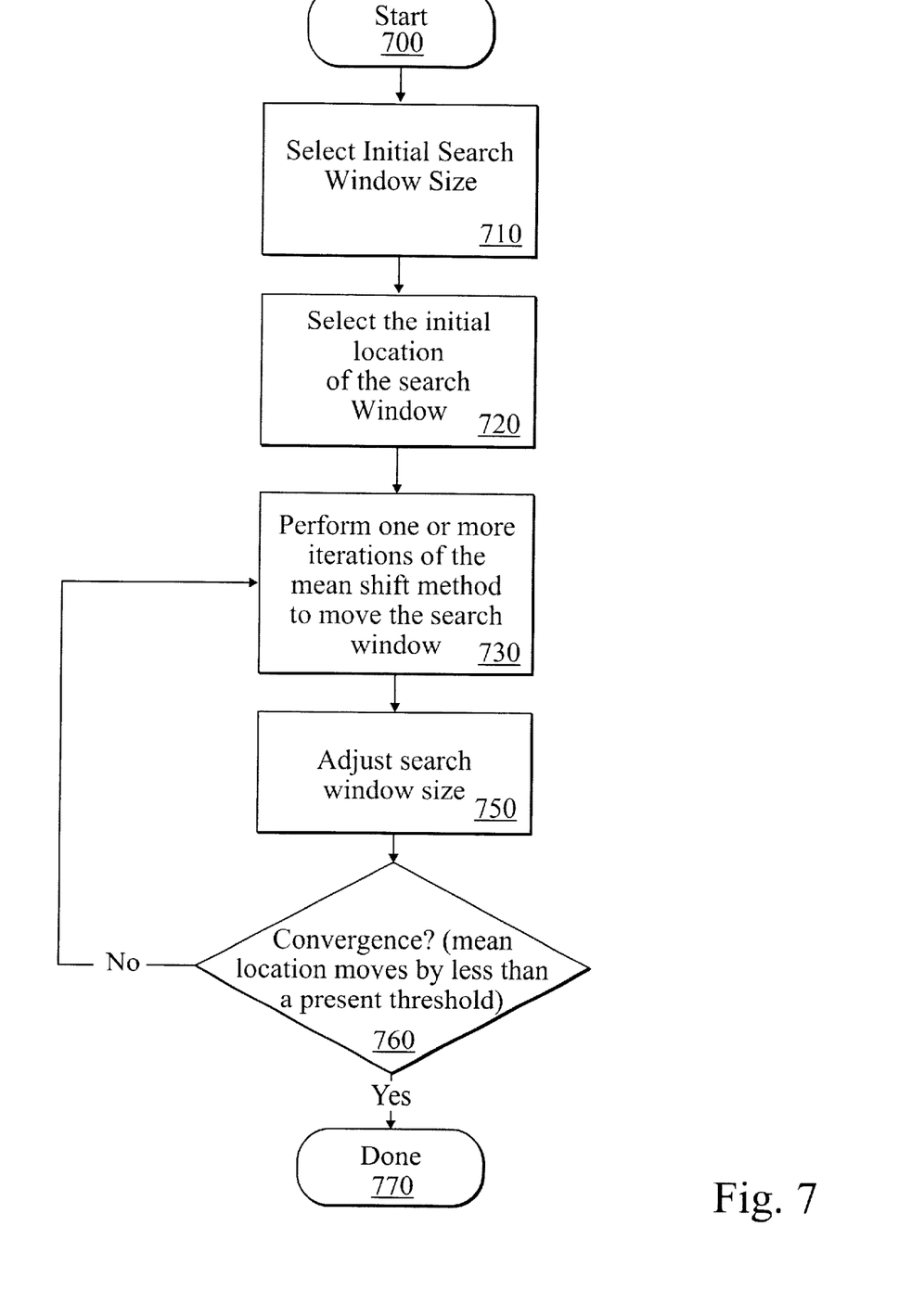
FIG. 7 illustrates a flow diagram describing the operation of the continuously adaptive mean shift method.

FIG. 7 graphically illustrates how the CAMSHIFT method of the present invention operates. At steps 710 and 720, an initial search window size and initial search window location are selected. The CAMSHWF method performs one or more iterations of the mean shift method to move the search window at step 730. At step 750, the method adjusts the size of the search window. The size of the search window may be dependent upon information gathered about the data. Next, at step 760, the method determines if it has converged upon the center of the probability distribution. If the mean shift method has converged, then the method is done. If the CAMSHIFT method has not converged then the method returns to step 730 where the mean shift method is performed using the new search window location with the new search window size is calculated.

Figure 8:
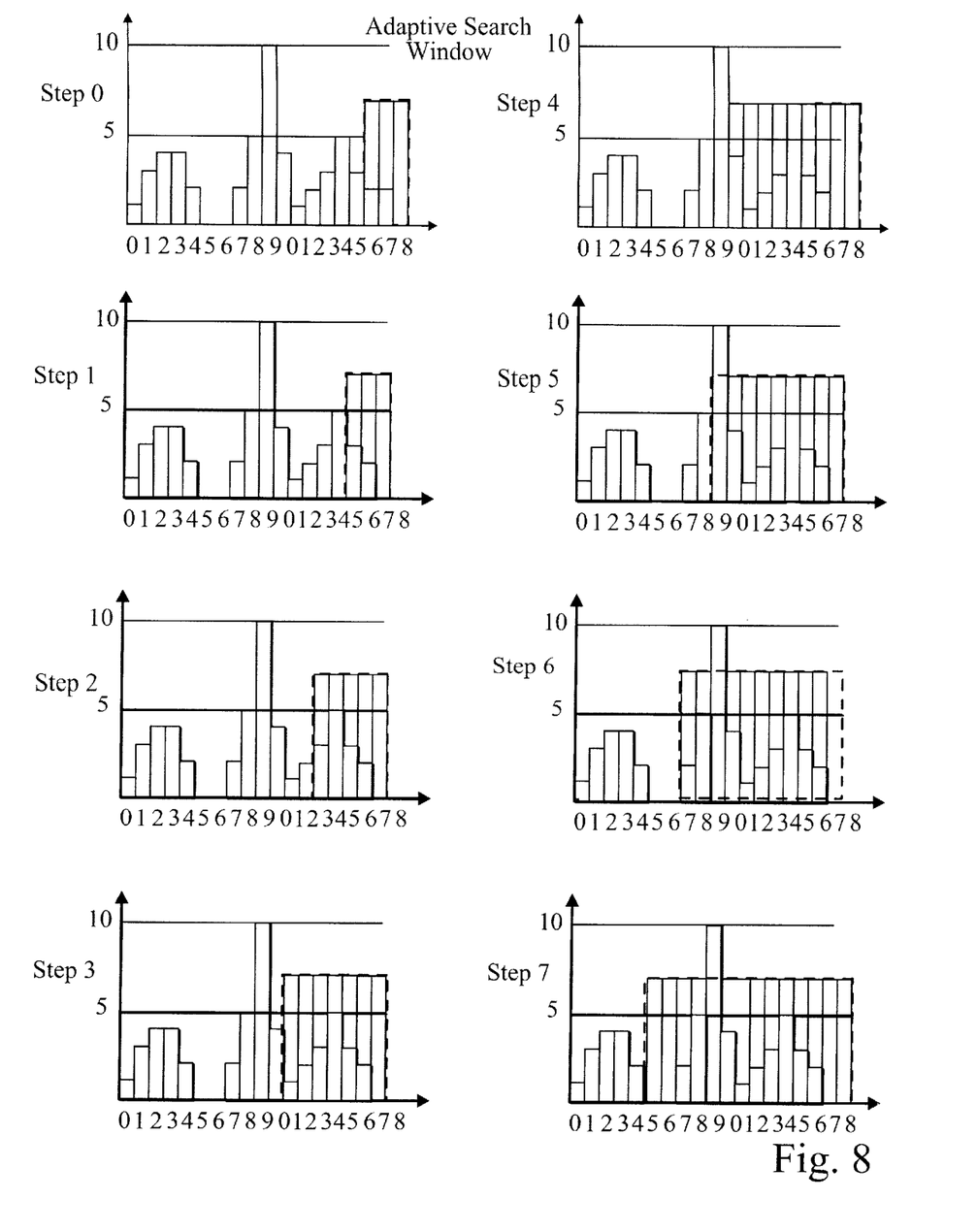
FIG. 8 illustrates example of the continuously adaptive mean shift method applied to one dimensional data.

An example of the continuously adaptive mean shift method in operation is presented in FIG. 8. Again, to simplify the explanation, the example is provided using a one dimension slice of a two dimensional probability distribution. However, the same principles apply for a two or more dimensional distribution. In the example of FIG. 8, the continuously adaptive mean shift method adjusts the search window to a size that is proportional square root of the zeroth moment. Specifically, the continuously adaptive mean shift method in the example of FIG. 8 in two dimensions adjusts the search window to have a width and height of:

$$w = h = 2 * \sqrt{M_{00}}. \quad (4)$$

wherein $M_{00}$ is the zeroth moment of the data within the search window. (See equation 1.) For N dimensional distributions where N ranges from 1 to infinity, each side of the search window would be set to $$w = \alpha_i * M_{00}^{\frac{1}{N}}. \quad (5)$$

where $\alpha_i$ is a positive constant. However, other embodiments may use other methods of determining the search window size.

Referring to step 0 of FIG. 8, a three sample wide search window is placed at an initial location. After a first iteration of the method, the search window is moved to the left as illustrated in step 1 of FIG. 6. The search window was moved left since the mean location of the search window samples was left of the initial search window location. After a second iteration, the search window is again moved left as illustrated in step 2 since the mean location of the search window samples in step I is left of the center of the search window in step 1. However, it should also be noted that the size of the search window increased since the amount of data in the search window has increased. After a third iteration, the center of the search window again moves left and the search window size again increases. It can be seen in the subsequent iterations that the adaptive mean shift method adjusts the window size as it converges upon the mean of the data. Referring to step 7 of FIG. 8, the continuously adaptive mean shift method converges upon the mean of the contiguous data. It has been found that the continuously adaptive mean shift method with a search window width and height set equal to $2*\sqrt{M_{00}}$ will typically find the center of the largest connected region of a probability distribution, a great benefit for tracking one of multiple confusable objects.

Head Tracking Using Continuously Adaptive Mean Shift

To provide an example usage of the continuously adaptive mean shift method, one specific embodiment of a head tracking system is provided. However, many variations exist. The example is provided with reference to FIG. 9, FIG. 10A and FIG. 10B.

To reduce the amount of data that needs to be processed, the head tracker uses a limited "calculation region" that defines the area that will be examined closely. Specifically, the calculation region is the area for which a probability distribution is calculated. Area outside of the calculation region is not operated upon. Referring to step 907 of FIG. 9, the head tracker initially sets the calculation region to include the entire video frame. The initial search window size and location is selected to capture a head that is substantially centered in the video frame. Again, the initial search window size can include the entire video frame. Thus, the present invention can be implemented without any initial search window size or search window location parameters that need to be determined.

Figure 9:
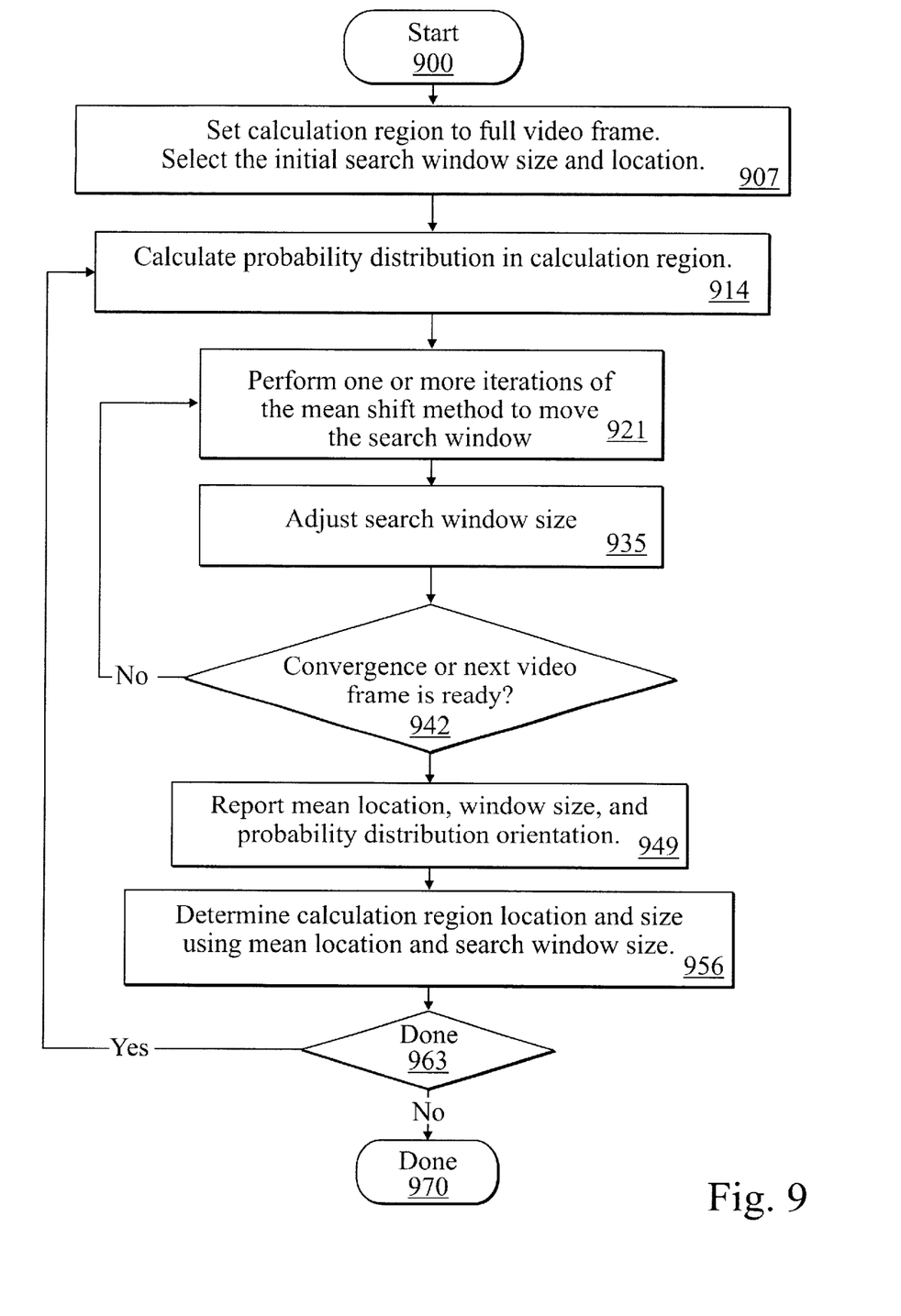
FIG. 9 illustrates a flow diagram describing the operation of a head tracker using the continuously adaptive mean shift method.

Next, at step 914, the flesh hue probability distribution is calculated in the calculation region. During the first iteration, the probability distribution is calculated for the entire video frame. The continuously adaptive mean shift method is applied by steps 921, 935, and 942 to locate the region with the highest probability density. At step 949, the size and location of the search window are reported. This information can be used for tracking the head location and size. The size parameter can be used to determine a distance of the head from the camera.

Figure 10A:
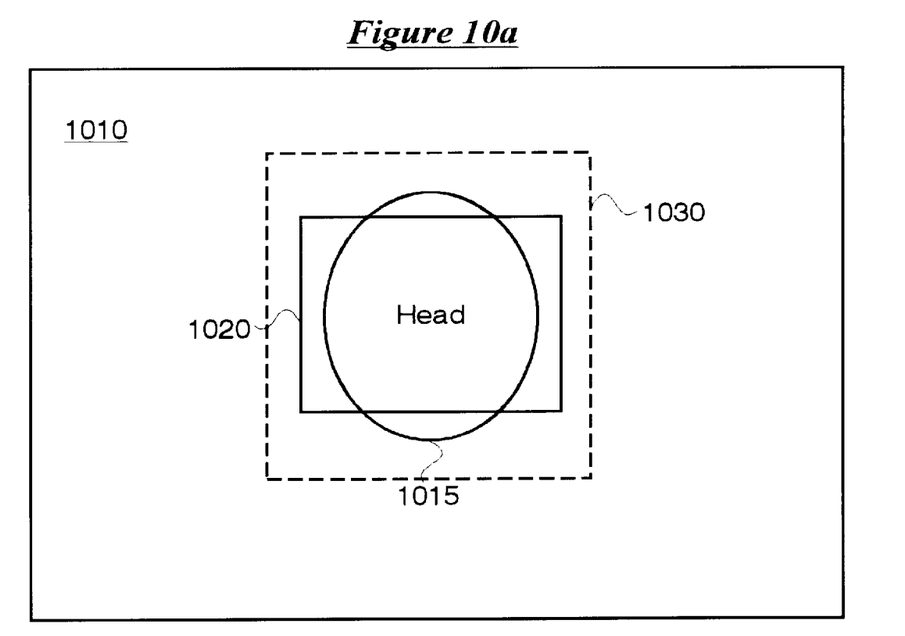
FIG. 10A illustrates a first diagram of a head within a video frame, a head tracker search window, and an calculation area used by the search window.
Figure 10B:
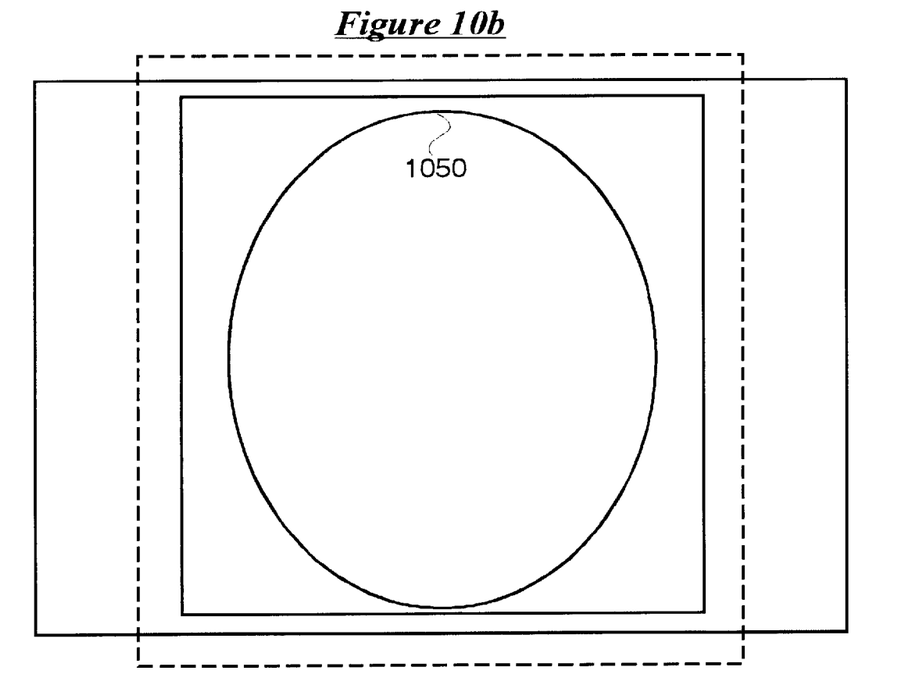
FIG. 10B illustrates a second diagram of a head within a video frame that is very close to the camera, a head tracker search window, and an calculation area used by the search window.

At step 956, the size and location of the search window are used to determine a new calculation region. The calculation region is the area 1030 centered around the search window 1020 as illustrated in FIG. 10A such that a flesh hue probability distribution will only be calculated for the area around the head. By using the size and location of the search window, the "lock" of the motion-tracker is reinforced on the object of interest. In the example of a head tracker, when a person is close to the camera as illustrated in FIG. 10B, the flesh probability distribution will be large and any movements they make will also be large in absolute number of pixels translated so the calculation region must be large. But when the person is far from the camera as illustrated in FIG. 10A, their flesh probability distribution will be small and even if the person moves quite fast the number of pixels that the person translates will be small since the person is so far from the camera, so the calculation region can be small. After determining the location of the new calculation region, the method returns to step 914 where the method calculates the probability distribution in the new calculation area. The method then proceeds to search for the area with the greatest probability density.

A Kickstart Method

To initially determine the size and location of the search window, other methods of object detection and tracking may be used. For example, in one embodiment, a motion difference is calculated for successive video frames. The center of the motion difference is then selected as the center of the search window since the center of the motion difference is likely to be a person in the image.

Search Window Sizing

In a digital embodiment such as digitized video images, the probability distributions are discrete. Since the methods of the present invention climb the gradient of a probability distribution, the minimum search window size must be greater than one in order to detect a gradient. Furthermore, in order to center the search window, the search window should be of odd size. Thus, for discrete distributions, the minimum window size is set at three. Also, as the method adapts the search window size, the size of the search window is rounded to the nearest odd number greater or equal to three in order to be able to center the search window. For tracking colored objects in video sequences, we adjust the search window size as described in equation 4.

Determining Orientation

After the probability distribution has been located by the search window, the orientation of the probability distribution can be determnined. In the example of a flesh hue tracking system to locate a human head, the orientation of the head can be determined. To determine the probability distribution orientation, the second moment of the probability distribution is calculated. Equation 6 describes how a second moment is calculated.

Second moments are:

$$M_{20} = \sum_x \sum_y x^2 I(x,y); \qquad M_{02} = \sum_x \sum_y y^2 I(x,y) \qquad (6)$$

After determining the second moments of the probability distribution, the orientation of the probability distribution (the angle of the head) can be determined.

Then the object orientation (major axis) is:

$$\theta = \frac{\arctan\left(\frac{2\left(\frac{M_{11}}{M_{00}} - x_c y_c\right)}{\left(\frac{M_{20}}{M_{00}} - x_c^2\right) - \left(\frac{M_{02}}{M_{00}} - y_c^2\right)}\right)}{2} \qquad (7)$$

In the embodiment of a head tracker, the orientation of the probability distribution is highly correlated with the orientation of the person's head.

The foregoing has described a method of tracking objects by tracking probability densities. It is contemplated that changes and modifications may be made by one of ordinary skill in the art, to the materials and arrangements of elements of the present invention without departing from the scope of the invention.

What is claimed is:

1. A method of tracking a probability distribution of an object, said method comprising:
    calculating a mean location of a probability distribution within a search window, the search window used to define the probability distribution whose mean location is to be calculated;
    centering said search window onto said mean location;
    resizing said search window; and
    repeating said calculating, resizing and centering.

2. The method as claimed in claim 1 wherein said calculating and centering are performed until said search window converges.

3. The method as claimed in claim 1 wherein resizing said search window comprising resizing said search window dependent upon data located within said search window.

4. The method as claimed in claim 1 wherein resizing said search window comprising resizing said search window to size that is proportional to the Nth root of a zeroth moment of said data wherein N is a dimension of said data located within said search window.

5. The method as claimed in claim 1 wherein calculating said mean location comprises calculating a zeroth and first moment of data within said search window.

6. The method as claimed in claim 1, said method further comprising: determining an orientation of said probability distribution.

7. A method of tracking an object within a video image, said method comprising:
    converting said video image into a probability distribution;
    calculating a mean location of a probability distribution within a search window, the search window used to define the probability distribution whose mean location is to be calculated;
    centering said search window onto said mean location; and
    repeating said calculating and centering.

8. The method as claimed in claim 7, said method further comprising: resizing said search window.

9. The method as claimed in claim 8 wherein resizing said search window comprising resizing said search window dependent upon data located within said search window.

10. The method as claimed in claim 8 wherein resizing said search window comprising resizing said search window to a length and a width that is proportional to the square root of a zeroth moment of said data located within said search window.

11. The method as claimed in claim 7 wherein calculating said mean location comprises calculating a zeroth and first moment of data within said search window.

12. The method as claimed in claim 7, said method further comprising determining an orientation of said probability distribution.

13. The method as claimed in claim 12 wherein determining said orientation comprises determining a major axis of said probability distribution.

14. The method as claimed in claim 7 wherein said probability distribution comprises a flesh hue probability distribution.

15. An apparatus for tracking an object, said apparatus comprising:
    a video camera, said video camera capturing an image of said object;
    a video digitizer, said video digitizer digitizing said image; and
    a computer system, said computer system converting said image into a probability distribution, said computer system iteratively calculating a mean location of a probability distribution within a search window of said image and centering said search window onto said mean location.

16. The apparatus as claimed in claim 15 wherein calculating said mean location comprises calculating a zeroth and first moment of data within said search window.

17. The apparatus as claimed in claim 15 wherein said computer system resizes said search window dependent upon data located within said search window.

18. The apparatus as claimed in claim 17 wherein resizing said search window comprising resizing said search window to size that is proportional to the Nth root of a zeroth moment of said data wherein N is a dimension of said data located within said search window.

19. The apparatus as claimed in claim 15 wherein calculating said mean location comprises calculating a zeroth and first moment of data within said search window.

20. The apparatus as claimed in claim 15 wherein said computer determines an orientation of said probability distribution.

* * * * *

UNITED STATES PATENT AND TRADEMARK OFFICE
CERTIFICATE OF CORRECTION

PATENT NO. : 6,394,557 B2
DATED : May 28, 2002
INVENTOR(S) : Bradski

It is certified that error appears in the above-identified patent and that said Letters Patent is hereby corrected as shown below:

Column 1,
Line 30, delete "bave", insert -- have --.

Column 5,
Line 1, delete "CAMSHWF", insert -- CAMSHIFT --.
Line 10, delete "CAMSHWF", insert -- CAMSHIFT --.
Line 56, delete "step I", insert -- step 1 --.

Column 7,
Line 19, delete "determnined", insert -- determined --.

Signed and Sealed this

Seventeenth Day of September, 2002

*Attest:*

*Attesting Officer*

JAMES E. ROGAN
*Director of the United States Patent and Trademark Office*